US008247786B2

(12) United States Patent
Tamiya et al.

(10) Patent No.: US 8,247,786 B2
(45) Date of Patent: Aug. 21, 2012

(54) NON-CONTACT DISPLACEMENT DETECTING DEVICE USING OPTICAL ASTIGMATISM

(75) Inventors: Hideaki Tamiya, Kanangawa (JP); Kayoko Taniguchi, Kanagawa (JP)

(73) Assignee: Magnescale Co., Ltd., Tokyo (JP)

( * ) Notice: Subject to any disclaimer, the term of this patent is extended or adjusted under 35 U.S.C. 154(b) by 352 days.

(21) Appl. No.: 12/382,077

(22) Filed: Mar. 9, 2009

(65) Prior Publication Data

US 2009/0261233 A1 Oct. 22, 2009

(30) Foreign Application Priority Data

Apr. 18, 2008 (JP) ................................. 2008-109467

(51) Int. Cl.
*G01N 21/86* (2006.01)
*H01J 3/14* (2006.01)

(52) U.S. Cl. ................................... 250/559.29; 250/216

(58) Field of Classification Search .................. 250/221, 250/559.01, 559.04–559.08, 216, 559.29, 250/201.3, 201.2, 201.4, 559.32; 356/614–619, 356/4.01; 369/44.23, 44.11, 44.14
See application file for complete search history.

(56) References Cited

U.S. PATENT DOCUMENTS

| 5,247,165 | A | * | 9/1993 | Hiruta et al. | ............... | 250/201.3 |
|---|---|---|---|---|---|---|
| 5,475,209 | A | * | 12/1995 | Nabeshima | ................ | 250/201.4 |
| 5,521,394 | A | * | 5/1996 | Nakanishi et al. | ........ | 250/559.22 |
| 5,706,091 | A | * | 1/1998 | Shiraishi | ........................ | 356/399 |
| 7,126,686 | B2 | * | 10/2006 | Tsujita | ........................... | 356/328 |
| 2007/0030483 | A1 | * | 2/2007 | Everett et al. | ................. | 356/328 |

FOREIGN PATENT DOCUMENTS

JP 05-089480 4/1993

* cited by examiner

*Primary Examiner* — Pascal M Bui Pho
(74) *Attorney, Agent, or Firm* — Rader Fishman & Grauer, PLLC

(57) ABSTRACT

A displacement detecting device includes a non-contact sensor having a light source, an objective lens focusing output light from the light source onto a measurement surface, and a light receiving element detecting displacement information based on a focal length of the objective lens by using reflected light from the measurement surface; a control unit adjusting the focal length based on the displacement information; a displacement-amount measuring unit having a linear scale attached to the objective lens with a link member therebetween and measuring an amount of displacement of the linear scale when the focal length is adjusted. A light adjustment member is disposed between the light source and the objective lens or between the objective lens and the light receiving element and has an aperture section transmitting the output and/or reflected light therethrough and a light blocking section that blocks a specific light component of the output and/or reflected light.

5 Claims, 17 Drawing Sheets

NON-CONTACT DISPLACEMENT DETECTING DEVICE USING OPTICAL ASTIGMATISM

BACKGROUND OF THE INVENTION

1. Field of the Invention

The present invention relates to displacement detecting devices that detect relative displacement between an objective lens and a surface to be measured by using an optical astigmatic method. More specifically, the present invention relates to a displacement detecting device having a light adjustment member disposed between a light source and an objective lens so as to adjust the resolution of output light focused on a surface to be measured or having a light adjustment member disposed between an objective lens and a light receiving element for regulating an incident angle of reflected light reflected by the surface to be measured so as to accurately measure the surface roughness of the surface to be measured.

2. Description of the Related Art

In the related art, displacement detecting devices have been widely used for measuring the displacement and the shape of a surface to be measured (which will be referred to as a "measurement surface" hereinafter). In a displacement detecting device, a laser beam emitted from a light source of a non-contact sensor is focused on a measurement surface through an objective lens, and a focus error signal is generated by an astigmatic method on the basis of reflected light reflected by the measurement surface. By performing servo control using this focus error signal, the focal length of the objective lens is shifted for adjustment. By reading the divisions on a linear scale integrally attached to the objective lens by means of a link member, displacement of the measurement surface is detected.

However, the above-described displacement detecting device is problematic in that it is difficult to achieve high detection accuracy since the focus error signal itself has poor linearity. Japanese Unexamined Patent Application Publication No. 5-89480 proposes a displacement detecting device that is configured to output a corrected output signal corresponding to the focus error signal of the non-contact sensor from a correction table. In this displacement detecting device, the beam diameter of light to be focused on an object to be measured is reduced by increasing the numerical aperture of the objective lens in order to achieve higher accuracy in the displacement detection. For example, the displacement detecting device uses a laser beam with about 2 µm in beam diameter (wavelength) as output light and achieves detection accuracy of about several nanometers to a hundred and some nanometers on the linear scale.

SUMMARY OF THE INVENTION

However, with an increase in resolving power of the displacement detecting device disclosed in Japanese Unexamined Patent Application Publication No. 5-89480, the output light may sometimes undesirably over-detect projections and recesses formed on the measurement surface as well as a foreign particle, such as dust, attached to the measurement surface. In such a case, because the output light is reflected and scattered due to the surface roughness of the measurement surface, the effect of a noise component becomes greater, thus unfavorably resulting in a measurement error. In addition, since the surface roughness of the measurement surface is detected with high accuracy, the projections and recesses on the measurement surface are undesirably output as large waveforms, making it difficult to obtain desired displacement information about the displacement and the shape of the measurement surface.

Therefore, it is desirable to provide a displacement detecting device that can alleviate an error caused by the effect of the surface roughness of the measurement surface as well as detect displacement of the measurement surface with optimal accuracy for a measurement purpose.

A displacement detecting device according to an embodiment of the present invention includes a non-contact sensor having a light source, an objective lens that focuses output light emitted from the light source onto a measurement surface to be measured, and a light receiving element that detects displacement information on the basis of a focal length of the objective lens by using reflected light reflected by the measurement surface after being focused on the measurement surface by the objective lens; a control unit that adjusts the focal length of the objective lens on the basis of the displacement information detected by the light receiving element; and a displacement-amount measuring unit having a linear scale that is attached to the objective lens with a link member therebetween and configured to measure an amount of displacement of the linear scale when the focal length of the objective lens is adjusted by the control unit. A light adjustment member is disposed at least between the light source and the objective lens or between the objective lens and the light receiving element, and has an aperture section through which the output light and/or the reflected light passes and a light blocking section that blocks a specific light component of the output light and/or the reflected light.

In the case where the light adjustment member is disposed between the light source and the objective lens in the displacement detecting device according to this embodiment of the present invention, the output light emitted from the light source enters the light adjustment member where the resolution of the output light is adjusted. For example, the light adjustment member adjusts the output light to reduce the resolution thereof by blocking a paraxial ray of the output light. The output light with the adjusted resolution is focused on the measurement surface by the objective lens. Due to the light adjustment member, the focused output light has reduced resolution and slightly increased beam diameter (i.e., beam spot) as compared to when there is no light adjustment member. The output light focused on the measurement surface is reflected by the measurement surface, and the reflected light is received by the light receiving element.

The control unit adjusts the focal length of the objective lens on the basis of the displacement information detected by the light receiving element. The displacement-amount measuring unit measures the amount of displacement of the objective lens when the focal length of the objective lens is adjusted by the control unit. The displacement-amount measuring unit has a linear scale that is attached to the objective lens. Since the linear scale moves concurrently with the adjustment of the focal length of the objective lens, an amount of displacement of the linear scale is measured.

In the case where the light adjustment member is disposed between the objective lens and the light receiving element in the displacement detecting device according to this embodiment of the present invention, the focused output light is reflected by the measurement surface, and the reflected light subsequently enters the light adjustment member. The light adjustment member regulates the entry of reflected light with a specific incident angle included in the reflected light reflected by the measurement surface. In consequence, for example, the entry of reflected light having an incident angle that can cause a measurement error in the measurement of the measurement surface can be regulated, whereby only reflected light having a specific incident angle is received by the light receiving element.

According to the embodiment of the present invention, since the light adjustment member may be disposed between the light source and the objective lens, output light with reduced resolution can be focused on the measurement surface. In consequence, the resolving power of the non-contact sensor can be reduced, thereby allowing for detection of displacement of the measurement surface with optimal accuracy for a measurement purpose.

According to the embodiment of the present invention, since the light adjustment member may be disposed between the objective lens and the light receiving element, the entry of reflected light having an incident angle that can cause a measurement error in the measurement of the measurement surface can be regulated, thereby allowing for an accurate measurement of the surface roughness of the measurement surface.

DESCRIPTION OF THE PREFERRED EMBODIMENTS

First Embodiment

A first embodiment of the present invention will be described below with reference to the drawings.

Figure 1:
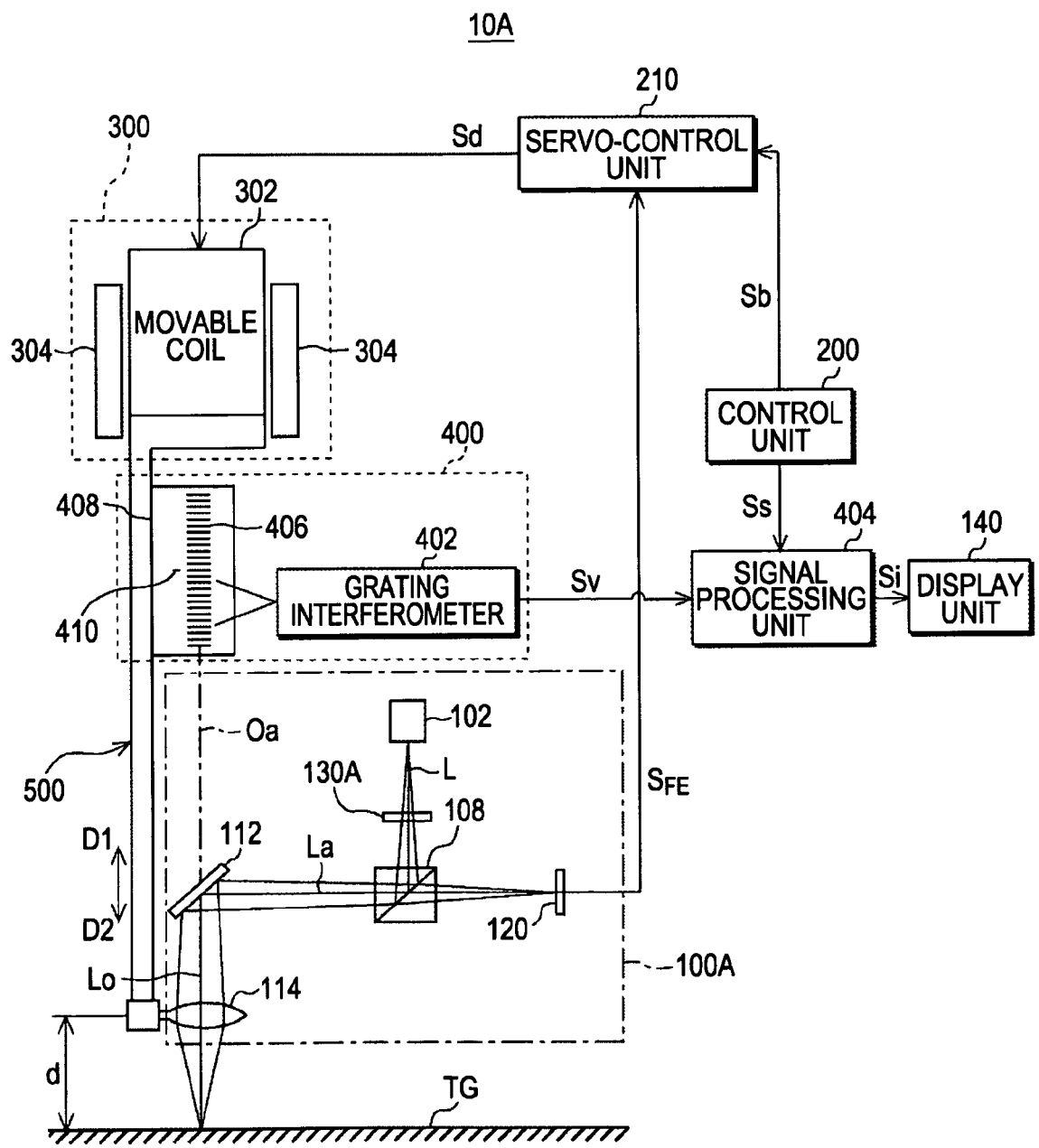
FIG. 1 illustrates the configuration of a displacement detecting device according to a first embodiment of the present invention.

FIG. 1 is a block diagram of a displacement detecting device 100A according to the first embodiment of the present invention. As shown in FIG. 1, the displacement detecting device 100A includes a non-contact sensor 100A, a control unit 200, a servo-control unit 210, an actuator 300, a displacement-amount measuring unit 400, a signal processing unit 404, and a display unit 140. For the sake of convenience, the configuration of the non-contact sensor 100A is shown in a simplified form in FIG. 1.

Figure 2:
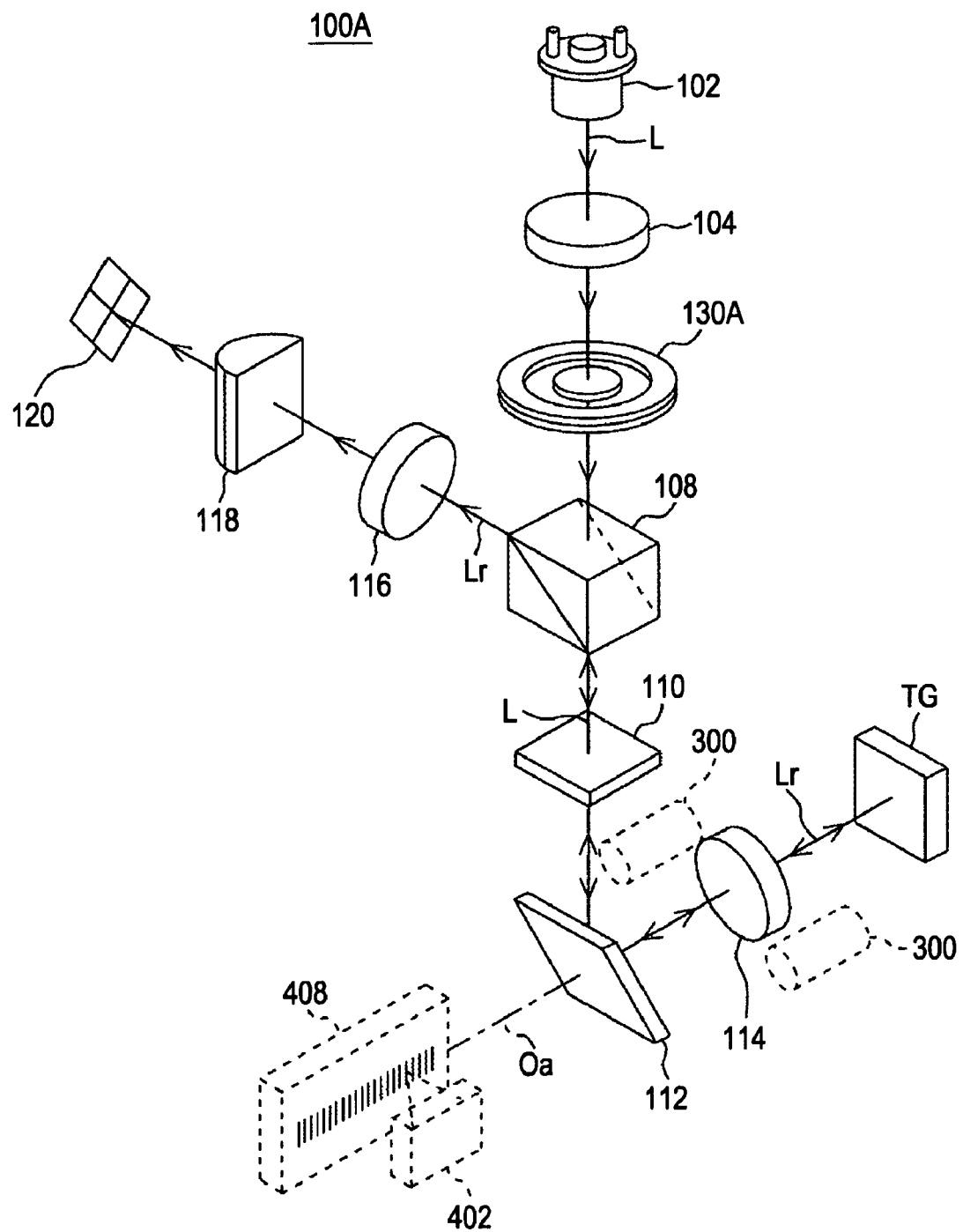
FIG. 2 is a perspective view showing the configuration of a non-contact sensor.

FIG. 2 is a perspective view showing the configuration of the non-contact sensor 100A. As shown in FIG. 2, the non-contact sensor 100A includes a light source 102, a collimator lens 104, a light adjustment member 130A, a polarizing beam splitter 108, a quarter-wave plate 110, a mirror 112, a first objective lens 114, a second objective lens 116, an astigmatism generating lens 118, and a light receiving element 120.

The light source 102 is formed of, for example, a semiconductor laser diode, a super luminescence diode, or a light emitting diode. The light source 102 emits output light L, such as a laser beam, towards the collimator lens 104. The collimator lens 104 converts the output light L emitted from the light source 102 into collimated light. The collimated output light L subsequently enters the light adjustment member 130A.

The light adjustment member 130A is configured to increase the beam diameter of the output light L, which is to be focused on a surface TG to be measured (which will be referred to as a "measurement surface TG" hereinafter) as compared to when there is no light adjustment member 130A, and is also configured to reduce the resolution of the output light L. Therefore, the light adjustment member 130A is an effective measure for minimizing over-detection of projections and recesses on the measurement surface TG, which can be caused when the measurement surface TG has a large degree of roughness and the beam diameter of the output light L is reduced too much. As shown in FIG. 2, the light adjustment member 130A is disposed between the collimator lens 104 and the polarizing beam splitter 108.

Figure 3A:
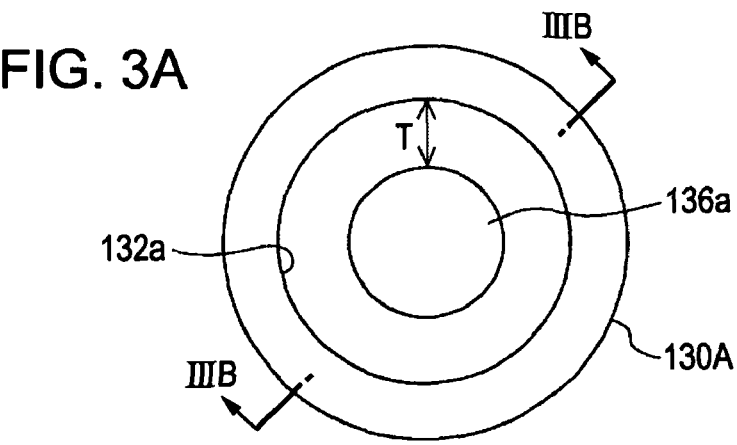
FIGS. 3A to 3C illustrate the configuration of a light adjustment member.
Figure 3B:
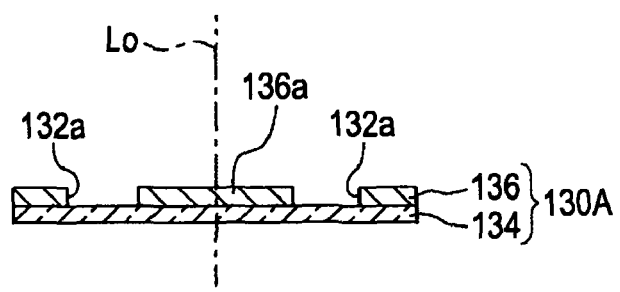
Figure 3C:
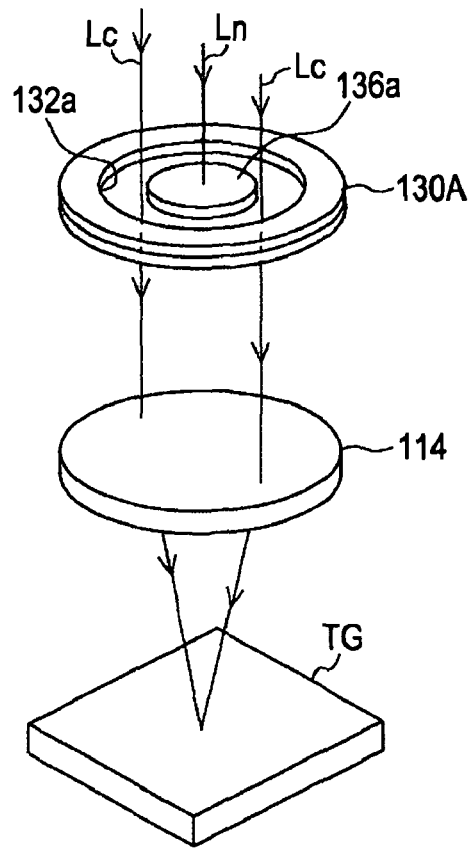

FIG. 3A is a plan view showing the configuration of the light adjustment member 130A. FIG. 3B is a cross-sectional view taken along line IIIB-IIIB in FIG. 3A. FIG. 3C illustrates a functional example of the light adjustment member 130A.

As shown in FIGS. 3A and 3B, the light adjustment member 130A is constituted by a cover glass 134 having a circular shape in plan view and a metallic layer 136 stacked on the cover glass 134 and having a predetermined pattern. The metallic layer 136 has a light blocking section 136a that blocks a paraxial ray of the output light L and an aperture section 132a that transmits the output light L toward the measurement surface TG. The light blocking section 136a is located in the middle of the metallic layer 136 as well as on an optical axis $L_o$. Moreover, the light blocking section 136a is circular in plan view and has at least an area for blocking a paraxial ray.

The aperture section 132a is pattern-formed into an annular shape that extends around the outer circumference of the light blocking section 136a. By adjusting an aperture dimension T of the aperture section 132a, the quantity of collimated light to be transmitted therethrough from the collimator lens 104 can be adjusted. The contour of the light adjustment member 130A as well as the shape of the light blocking section 136a and the aperture section 132a are not limited to a circular shape or an annular shape, and may alternatively be, for example, a rectangular shape.

For example, the light adjustment member 130A is formed by first forming the metallic layer 136 on the cover glass 134 and then patterning the formed metallic layer 136 into a predetermined shape by photolithography. The metallic layer 136 is composed of, for example, chromium, iron, nickel, copper, or magnesium.

Accordingly, as shown in FIG. 3C, when the output light L passes through the collimator lens 104 to enter the light adjustment member 130A, a paraxial ray (first output light component) $L_n$ of the output light L is blocked by the light blocking section 136a. On the other hand, a peripheral light component (second output light component) $L_c$ that surrounds the paraxial ray $L_n$ passes through the cover glass 134 of the light adjustment member 130A via the aperture section 132a. As this peripheral light component $L_c$ passes through the aperture section 132a in the light adjustment member 130A, the beam diameter thereof is slightly increased.

Referring to FIG. 2 again, the output light L exiting the light adjustment member 130A travels through the polarizing beam splitter 108 so as to enter the quarter-wave plate 110. The quarter-wave plate 110 converts the incident output light L, which is linearly polarized light, to circularly polarized light that is oriented rightward. The output light L exiting the quarter-wave plate 110 is reflected by the mirror 112 towards the measurement surface TG so as to become incident on the first objective lens 114.

The first objective lens 114 is an optical element formed of a lens having a predetermined numerical aperture, and is disposed in a movable manner so as to accord with a focal length f1. The output light L incident on the first objective lens 114 is focused on the measurement surface TG. Due to the light adjustment member 130A, the output light L focused on the measurement surface TG has reduced resolution and slightly increased beam diameter as compared to when there is no light adjustment member 130A.

The output light L focused on the measurement surface TG is reflected by the measurement surface TG. The output light L reflected by the measurement surface TG, i.e., reflected light $L_r$, is then reflected by the mirror 112 after traveling through the first objective lens 114, so as to enter the quarter-wave plate 110.

The incident reflected light $L_r$, which is right-polarized light, is rotated further rightward by the quarter-wave plate 110 so that the reflected light $L_r$ is converted to linearly polarized light that is deviated from the output light L by one-half wavelength. The reflected light $L_r$ exiting the quarter-wave plate 110 enters the polarizing beam splitter 108 again.

Since the incident reflected light $L_r$ is deviated from the output light L by one-half wavelength, the polarizing beam splitter 108 reflects the reflected light $L_r$ towards the second objective lens 116. In consequence, the reflected light $L_r$ reflected by the polarizing beam splitter 108 enters the second objective lens 116.

The second objective lens 116 is an optical element formed of a lens having a predetermined numerical aperture, and is configured to focus the incident reflected light $L_r$ onto the astigmatism generating lens 118 while giving the reflected light $L_r$ a predetermined beam diameter. The astigmatism generating lens 118 has a semicylindrical shape such that the curved surface thereof is configured to converge and diverge light, whereas the flat surface thereof is configured to directly transmit light. The reflected light $L_r$ incident on the astigmatism generating lens 118 is focused on the light receiving element 120.

Figure 4A:
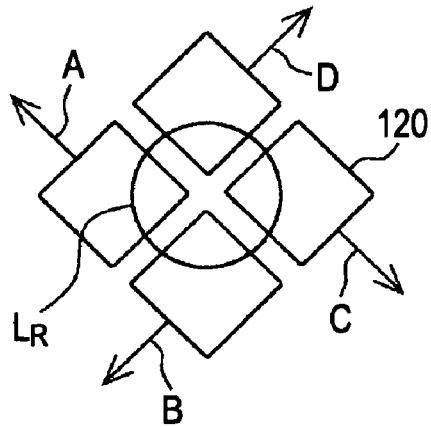
FIGS. 4A to 4C illustrate a light receiving operation of a light receiving element.
Figure 4B:
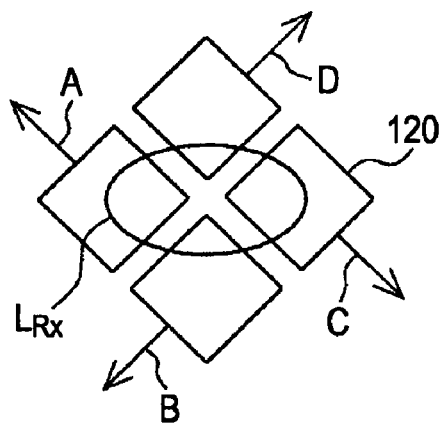
Figure 4C:
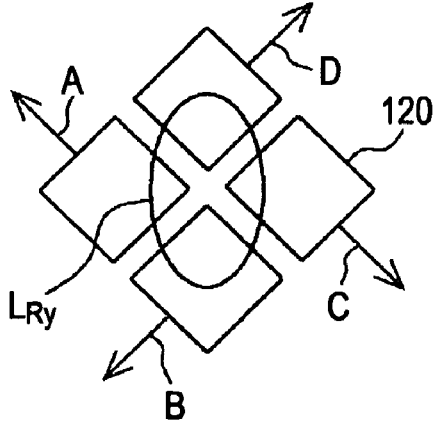

Based on the reflected light $L_r$ focused on the light receiving element 120 by the astigmatism generating lens 118, the light receiving element 120 generates a focus error signal (displacement information) $S_{FE}$ and sends it to the servo-control unit 210. The light receiving element 120 is a photodiode unit that is divided into four diodes. FIGS. 4A to 4C illustrate the beam diameter of the reflected light $L_r$ focused on the four diodes. When the measurement surface TG is at a position corresponding to the focal length f1 (see FIG. 1) of the first objective lens 114, the focused light forms a circular beam spot $L_R$, as shown in FIG. 4A. When the first objective lens 114 is moved away from the position corresponding to the focal length f1 relative to the measurement surface TG, the focused light forms a beam spot $L_{Rx}$ having a horizontally oblong elliptical shape, as shown in FIG. 4B. When the first objective lens 114 is moved closer to the measurement surface TG relative to the position corresponding to the focal length f1, the focused light forms a beam spot $L_{Ry}$ having a vertically oblong elliptical shape, as shown in FIG. 4C.

If output signals output from the four respective diodes are defined as output signals A, B, C, and D, the focus error signal $S_{FE}$ that expresses deviation of the focal length f1 can be determined by the following formula (1):

$$S_{FE}=(A+C)-(B+D) \qquad (1)$$

Figure 5:
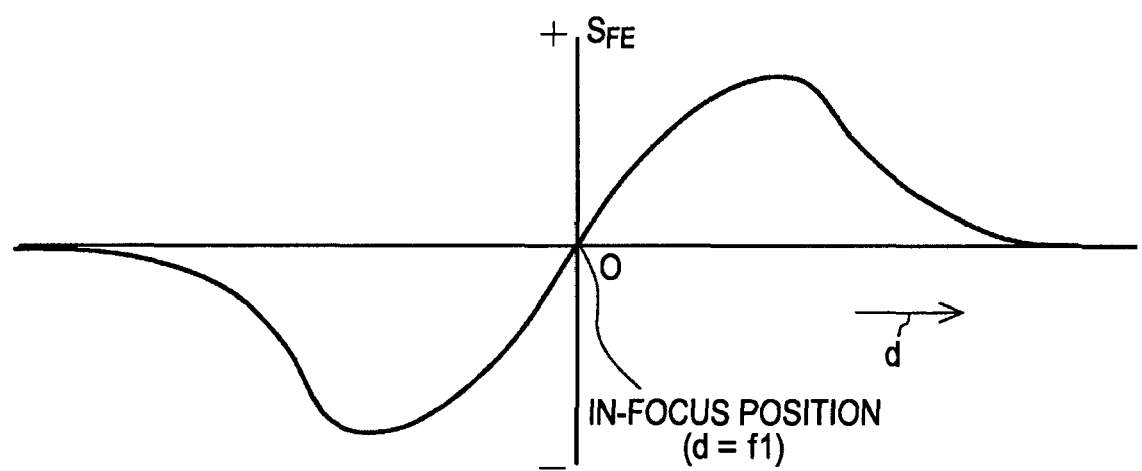
FIG. 5 illustrates a characteristic of a focus error signal.

In this case, the focus error signal $S_{FE}$ determined by the formula (1) has a characteristic as shown in the graph in FIG. 5. In the characteristic shown in FIG. 5, when an origin point O denotes an in-focus position and reference character d denotes the distance between the first objective lens 114 and the measurement surface TG, the focal length f1 and the distance d are equal to each other at the origin point O.

Referring to FIG. 1 again, the servo-control unit 210 is an example of a control unit that adjusts the focal length f1 of the first objective lens 114 on the basis of the focus error signal $S_{FE}$ output from the light receiving element 120. The servo-control unit 210 includes a servo-amplifier (not shown) and a comparator circuit (not shown). The servo-amplifier amplifies the received focus error signal $S_{FE}$ and supplies it to the comparator circuit. The comparator circuit compares the focus error signal $S_{FE}$ with a preset reference value. The reference value is set within a permissible range for an error in the focal length f1, and is stored in, for example, a read-only memory of the comparator circuit. Based on a result obtained by comparing the focus error signal $S_{FE}$ with the reference value, if the value of the focus error signal $S_{FE}$ is above the permissible range of the reference value, the servo-control unit 210 generates a drive signal (current signal) $S_d$ that causes the value of the focus error signal $S_{FE}$ to be zero, and supplies the drive signal $S_d$ to the actuator 300.

The actuator 300 includes a movable coil 302, a permanent magnet 304, and a link member 500. An upper end of the link member 500 is attached to a lower section of the movable coil 302. The first objective lens 114 is attached and fixed to a lower end of the link member 500. In accordance with the drive signal $S_d$ supplied from the servo-control unit 210, the movable coil 302 moves the link member 500 in directions indicated by arrows D1 and D2 so as to cause the value of the focus error signal $S_{FE}$ to be zero. In concurrence with this movement, the first objective lens 114 integrally attached to the link member 500 also moves in the directions of the arrows D1 and D2, thereby performing feedback control that can maintain the distance d between the first objective lens 114 and the measurement surface TG equal to the focal length f1 of the first objective lens 114. Alternatively, the actuator 300 may be attached near the first objective lens 114, as shown in FIG. 2.

Since a voice coil motor is used as the actuator 300, the linearity with respect to the displacement of the measurement surface TG is high. The reason that a voice coil motor is used is that a voice coil motor moves linearly in response to electric current supplied to the movable coil 302. Therefore, the amount of displacement can be readily detected by measuring the electric current supplied to the movable coil 302. As an alternative to a voice coil motor, the actuator 300 may be defined by, for example, a direct-current servo motor, a stepping motor, or a piezoelectric device.

The displacement-amount measuring unit 400 includes a linear scale 408 and a grating interferometer 402. The linear scale 408 has divisions (i.e., a light blocking pattern) 406 composed of, for example, chromium and arranged at a predetermined pitch. The linear scale 408 is attached and fixed to a predetermined position of the link member 500. An origin point 410 is provided substantially in the middle of the divisions 406 on the linear scale 408. The divisions 406 on the linear scale 408 are set in alignment with an extension $O_a$ of the optical axis $L_o$ of the first objective lens 114. In other words, the linear scale 408 is disposed in line with the optical axis $L_o$ of the first objective lens 114. The linear scale 408 may be defined by, for example, an optical scale (hologram scale) on which interference fringes of light are recorded as the divisions 406. As an alternative to an optical scale, a magnetic scale or a volume scale may be used.

The grating interferometer 402 is secured to, for example, a chassis (not shown). The grating interferometer 402 reads a value of a division 406 on the linear scale 408 to generate a division-value read signal $S_v$ and supplies the generated division-value read signal $S_v$ to the signal processing unit 404. When the measurement surface TG is displaced, the first objective lens 114 and the linear scale 408 are moved in the same direction by the same distance so as to maintain the focal length f1. Therefore, the grating interferometer 402 reads the amount of this displacement by referring to the divisions 406 on the linear scale 408. The grating interferometer 402 is movable along the extension $O_a$ of the optical axis $L_o$ in the directions of the arrows D1 and D2 (upward and downward) and can be secured to the chassis at a position to which the grating interferometer 402 is moved.

The signal processing unit 404 calculates the amount of displacement of the measurement surface TG on the basis of the division-value read signal $S_v$ output from the grating interferometer 402. Subsequently, the signal processing unit 404 performs predetermined image signal processing on the basis of a control signal $S_s$ from the control unit 200 so as to generate an image signal $S_i$ based on the calculated amount of displacement, and then outputs the image signal $S_i$ to the display unit 140. The image signal $S_i$ generated by the signal processing unit 404 may be stored in a data logger (not shown).

The display unit 140 may be formed of, for example, a liquid crystal display (LCD), a plasma display panel (PDP), or an electro luminescence (EL) display. The display unit 140 is configured to perform a display operation on the basis of the image signal $S_i$ output from the signal processing unit 404 so as to display the displacement information of the measurement surface TG on a display screen of the display unit 140, thereby readily allowing for an automatic measurement.

The control unit 200 is configured to control the operations of the servo-control unit 210 and the signal processing unit 404, and is constituted by, for example, a central processing unit (CPU), a read-only memory (ROM), and a random access memory (RAM).

Figure 6:
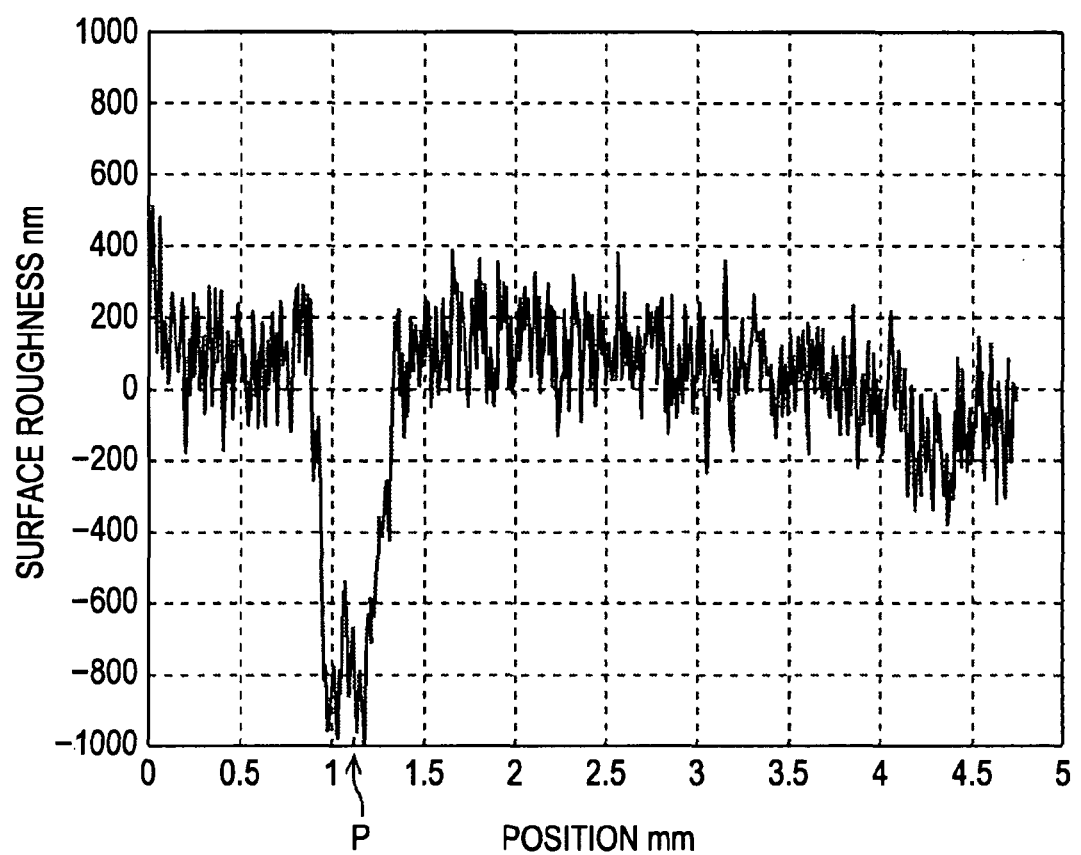
FIG. 6 illustrates a measurement result obtained when a measurement surface is measured using a displacement detecting device of the related art.
Figure 7:
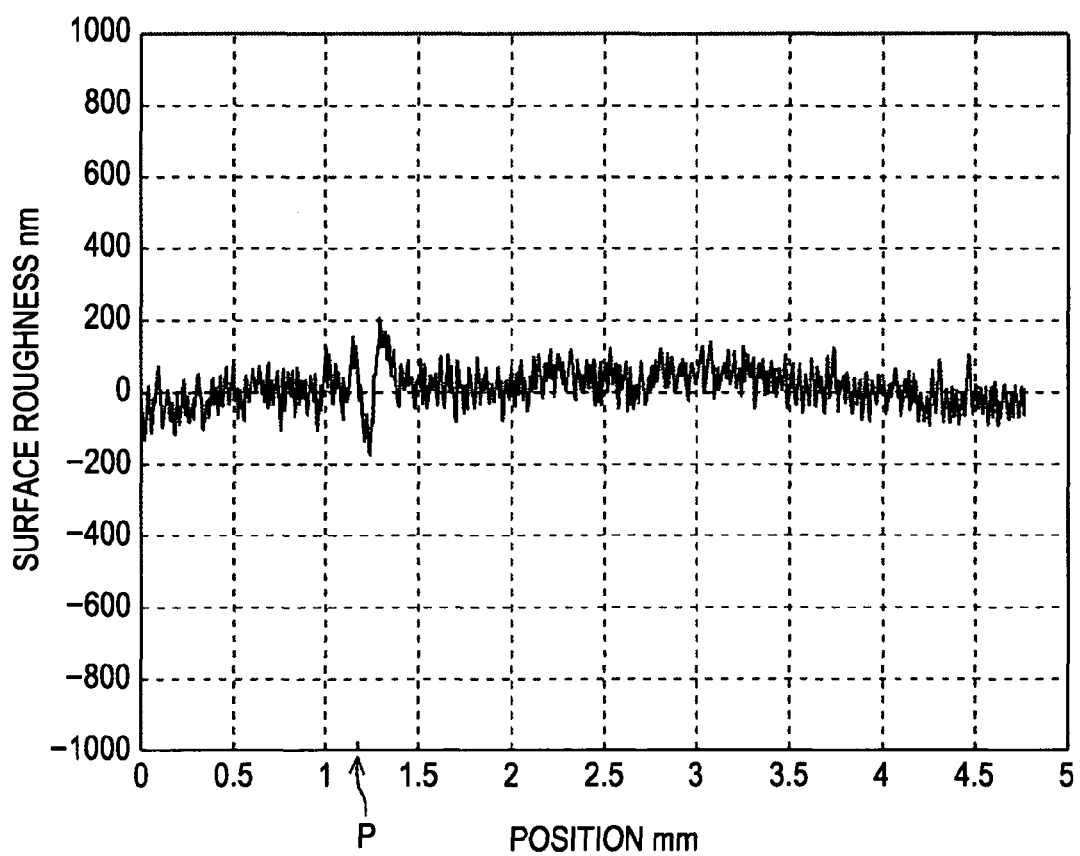
FIG. 7 illustrates a measurement result obtained when the measurement surface is measured using the displacement detecting device according to the embodiment of the present invention.

A measurement result obtained by measuring the measurement surface TG using a displacement detecting device of the related art and a measurement result obtained by measuring the measurement surface TG using the displacement detecting device 10A according to the embodiment of the present invention will now be described. FIGS. 6 and 7 are graphs that illustrate examples of measurement results displayed on the screen of the display unit 140, in which the ordinate axis indicates the surface roughness and the abscissa axis indicates the measured position of the measurement surface TG. The results shown in FIGS. 6 and 7 are obtained by scanning the output light L in a predetermined direction from a reference position (0 mm) on the measurement surface TG.

FIG. 6 illustrates the measurement result obtained by measuring the measurement surface TG using the displacement detecting device of the related art. In the related art, as shown in FIG. 6, since the resolution of the output light emitted from the light source is high, an uneven-surface pattern on the measurement surface TG is undesirably detected with high resolving power. For this reason, the projections and recesses on the measurement surface TG are shown as large waveforms in the graph in FIG. 6. When a foreign particle, such as dust, is attached to a position P on the measurement surface TG, this foreign particle is undesirably detected with high resolving power so as to be shown as a large depressed pattern.

The following describes the case where the displacement detecting device 100A according to the embodiment of the present invention is used. FIG. 7 illustrates the measurement result obtained by measuring the measurement surface TG using the displacement detecting device 100A according to this embodiment of the present invention. Since the aforementioned light adjustment member 130A is disposed between the collimator lens 104 and the polarizing beam splitter 108, the resolution of the output light L is adjusted to a lower level, thereby reducing the resolving power for the uneven-surface pattern on the measurement surface TG. Therefore, the waveforms formed by the uneven-surface pattern can be made smaller as compared to those in the related art shown in FIG. 6. In addition, even if a foreign particle, such as dust, is attached to a position P on the measurement surface TG, the foreign particle can be favorably shown as a smaller depressed pattern as compared to that in the related art shown in FIG. 6.

As described above, since the light adjustment member 130A is disposed between the light source 102 and the first objective lens 114 in this embodiment, the output light L can be reduced in resolution as well as increased in beam diameter before being focused on the measurement surface TG. Consequently, the resolving power of the non-contact sensor 101A can be reduced, whereby the surface roughness of the measurement surface TG can be detected with optimal accuracy for a measurement condition.

Since the linear scale 408 movable together with the first objective lens 114 is disposed coaxially with or in line with the optical axis $L_o$ of the first objective lens 114, there is substantially no Abbe error in the amount of displacement obtained by the displacement detecting device 100A. Therefore, because the ratio of the amount of displacement of the linear scale 408 to the amount of displacement of the first objective lens 114 is 1:1, the amount of displacement can be detected with extremely high accuracy.

In addition, a wide detecting range can be obtained without impairing the detection accuracy so long as the range is within the detectable range (i.e., a full scale range including all of the divisions 406) of the linear scale 408.

Moreover, with the feedback control, a measurement error can be prevented from occurring even if the sensitivity to the focus error signal $S_{FE}$ changes depending on the reflectivity of the measurement surface TG and an error caused by drifting or variation in the components included in the actuator 300 and the servo system can also be prevented from occurring. Thus, adjustment and correction processes can be omitted, thereby allowing for stable detection over a long period of time.

Furthermore, the origin point 410 formed in the linear scale 408 is advantageous in that the amount of displacement of the measurement surface TG can be detected by using the origin point 410 as a reference position.

Second Embodiment

Figure 8A:
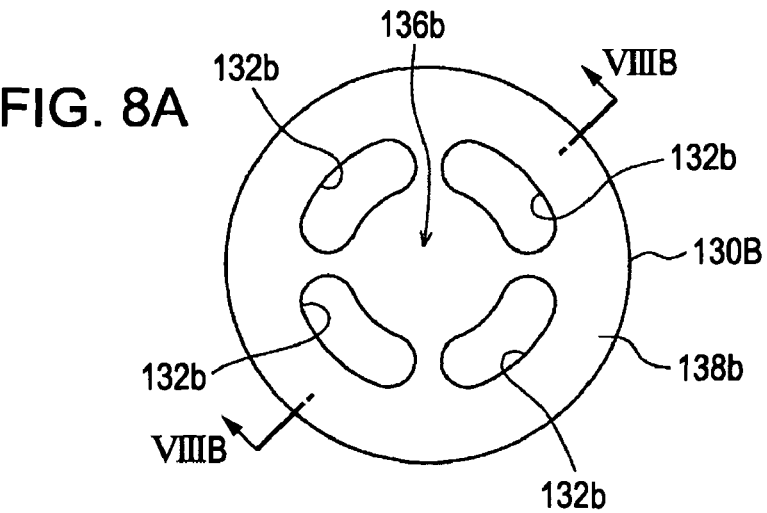
FIGS. 8A to 8C illustrate the configuration of a light adjustment member according to a second embodiment of the present invention.
Figure 8B:
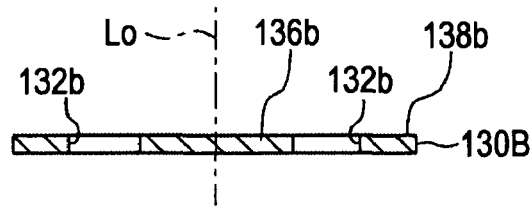
Figure 8C:
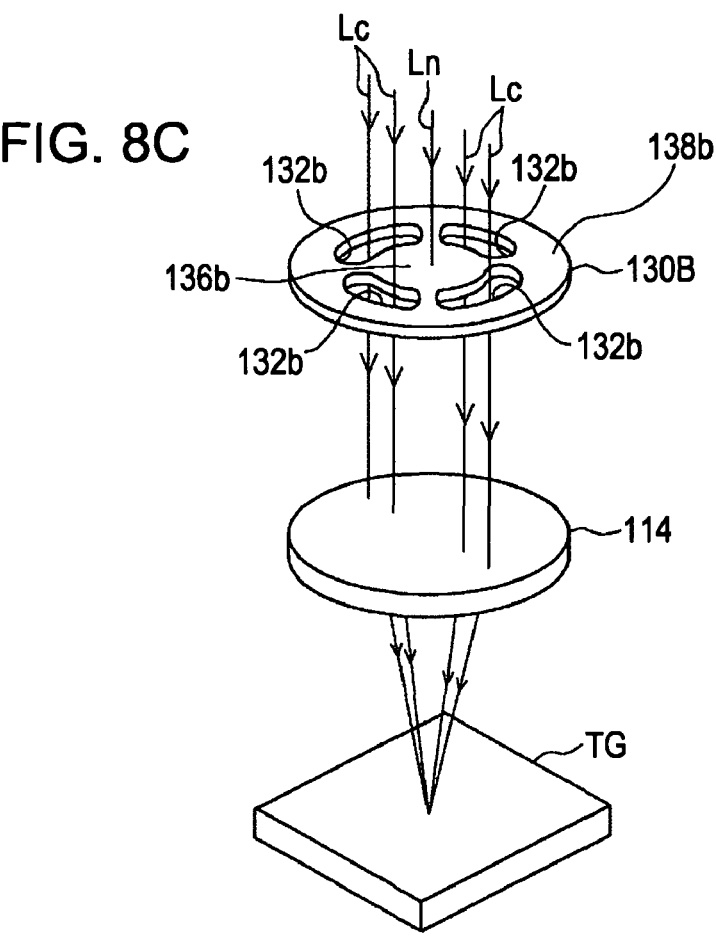

A second embodiment of the present invention is equipped with a light adjustment member 130B having a configuration different from that of the aforementioned light adjustment member 130A. FIG. 8A is a plan view showing the configuration of the light adjustment member 130B. FIG. 8B is a cross-sectional view taken along line VIIIB-VIIIB in FIG. 8A. FIG. 8C illustrates a functional example of the light adjustment member 130B.

As shown in FIGS. 8A and 8B, the light adjustment member 130B is formed of a flat plate having a circular shape in plan view and composed of, for example, a metallic material or a glass material. The light adjustment member 130B has a main light-adjustment-member body 138b, a light blocking section 136b that blocks a paraxial ray of the output light L, and an aperture section 132b that transmits the output light L toward the measurement surface TG.

The light blocking section 136b is provided in the middle of the main light-adjustment-member body 138b and is located on the optical axis $L_o$ of the output light L. The light blocking section 136b defines a circular area in plan view and has at least an area for blocking a paraxial ray. In this embodiment, the aperture section 132b is constituted by four apertures 132b arranged at equal intervals along the outer edge of the light blocking section 136b. Each aperture 132b is ellipsoidal and curved to form a circular arc shape.

According to this configuration, when the output light L enters the light adjustment member 130B, the paraxial ray L, is blocked by the light blocking section 136b while the peripheral light component $L_c$ surrounding the paraxial ray $L_n$ passes through the aperture section 132b so as to exit the light adjustment member 130B. The peripheral light component $L_c$ exiting the light adjustment member 130B is focused onto the measurement surface TG by the first objective lens 114. Due to the light adjustment member 130B, the output light L focused on the measurement surface TG has reduced resolution and slightly increased beam diameter as compared to when there is no light adjustment member 130B.

Like the first embodiment, the light adjustment member 130B is disposed between the light source 102 and the first objective lens 114 in this embodiment. Thus, the resolving power of the non-contact sensor 100A can be reduced so that an error caused by the effect of the surface roughness of the measurement surface TG is alleviated, whereby the displacement of the measurement surface TG can be detected with higher accuracy.

Third Embodiment

A third embodiment of the present invention will be described below with reference to the drawings. A light adjustment member 130C in this embodiment differs from those in the first and second embodiments in that it functions as a member that prevents entry of diffracted light from an object to be measured. Components that are similar to those in the displacement detecting device 100A and the non-contact sensor 100A described in the first embodiment are given the same reference numerals, and the detailed description thereof will be omitted here.

Figure 9:
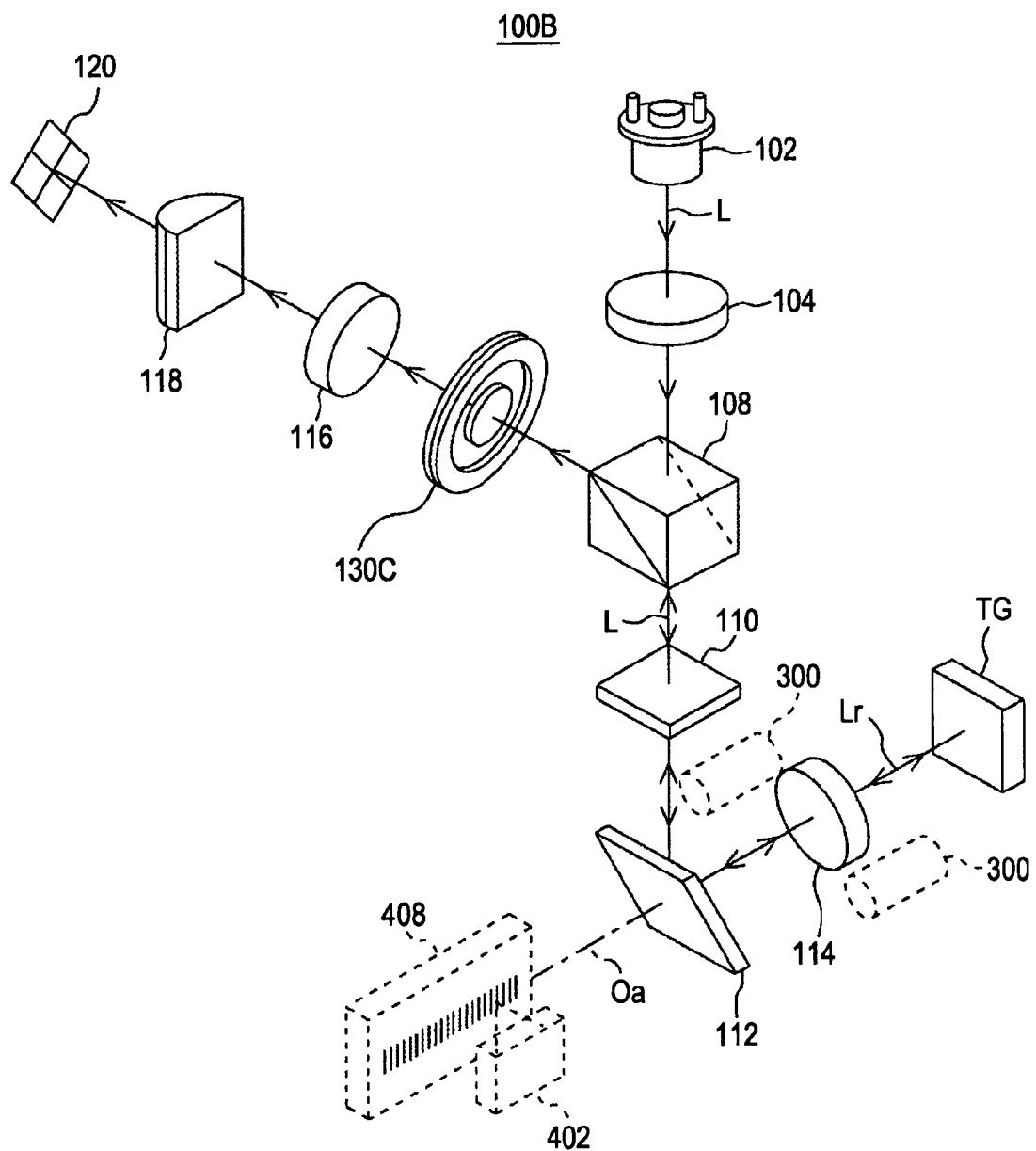
FIG. 9 illustrates the configuration of a displacement detecting device according to a third embodiment of the present invention.

FIG. 9 is a perspective view showing the configuration of a non-contact sensor 100B. As shown in FIG. 9, the non-contact sensor 100B includes the light source 102, the collimator lens 104, the light adjustment member 130C, the polarizing beam splitter 108, the quarter-wave plate 110, the mirror 112, the first objective lens 114, the second objective lens 116, the astigmatism generating lens 118, and the light receiving element 120. The light adjustment member 130C is configured to limit a specific incident angle of light and is disposed between the polarizing beam splitter 108 and the second objective lens 116, as shown in FIG. 9. The light adjustment member 130C has the same configuration as that in the first embodiment.

Figure 10:
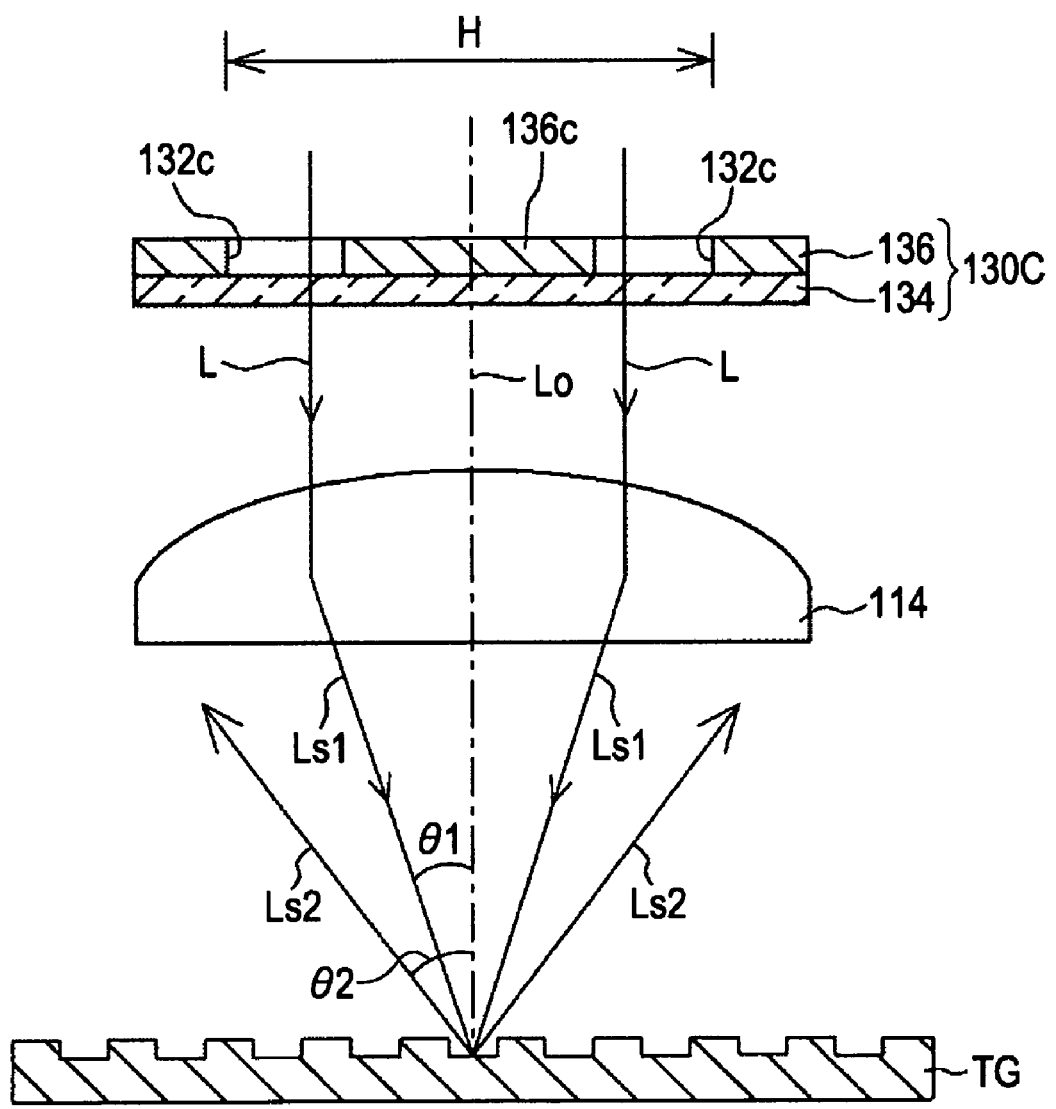
FIG. 10 illustrates the configuration of a light adjustment member shown in FIG. 9.

FIG. 10 illustrates a functional example of the light adjustment member 130C shown in FIG. 9. In FIG. 10, only the light adjustment member 130C and the first objective lens 114 of the non-contact sensor 100B are shown. As shown in FIG. 10, output light L passing through an aperture section 132c in the light adjustment member 130C is focused onto the measurement surface TG by the first objective lens 114. The focused output light L is reflected by the measurement surface TG. In this case, if the measurement surface TG has an uneven-surface pattern of, for example, a diffraction grating, the output light L enters the measurement surface TG at, for example, an angle $\theta_1$ with respect to the optical axis $L_o$ and is diffracted by the uneven-surface pattern at an angle $\theta_2$. The light entering the measurement surface TG at the angle $\theta_1$ will be referred to as "incident light $L_{s1}$" and the reflected light diffracted by the measurement surface TG at the angle $\theta_2$ will be referred to as "diffracted light $L_{s2}$". The diffracted light $L_{s2}$ is diffracted by a specific angle depending on the uneven-surface pattern of the diffraction grating. Since the phase of the diffracted light $L_{s2}$ reflected at the angle $\theta_2$ is deviated, an error is highly expected to occur in the detection by the light receiving element 120.

In such a case, an incident angle of the diffracted light $L_{s2}$ can be regulated by setting an aperture diameter H of the aperture section 132c in the light adjustment member 130C on the basis of the following formula (2):

$$\sin\theta_1 \pm \sin\theta_2 = m\lambda/d \qquad (2)$$

Here, d denotes grating spacing (grating period), m denotes an order (diffraction order), and $\lambda$ denotes a wavelength.

In this case, the aperture diameter H of the aperture section 132c in the light adjustment member 130C is set to satisfy the condition $|\theta_1| \neq |\theta_2|$ on the basis of the aforementioned formula (2) so as to reduce the effect of diffracted light by the diffraction grating, thereby achieving stable focusing accuracy. In other words, not only can the resolution of a beam spot be changed, as described in the first embodiment, but entry of specific diffraction light can be advantageously prevented. Consequently, an error caused by the effect of the surface roughness of the measurement surface TG can be alleviated, whereby the displacement of the measurement surface TG can be detected with higher accuracy.

Fourth Embodiment

Figure 11A:
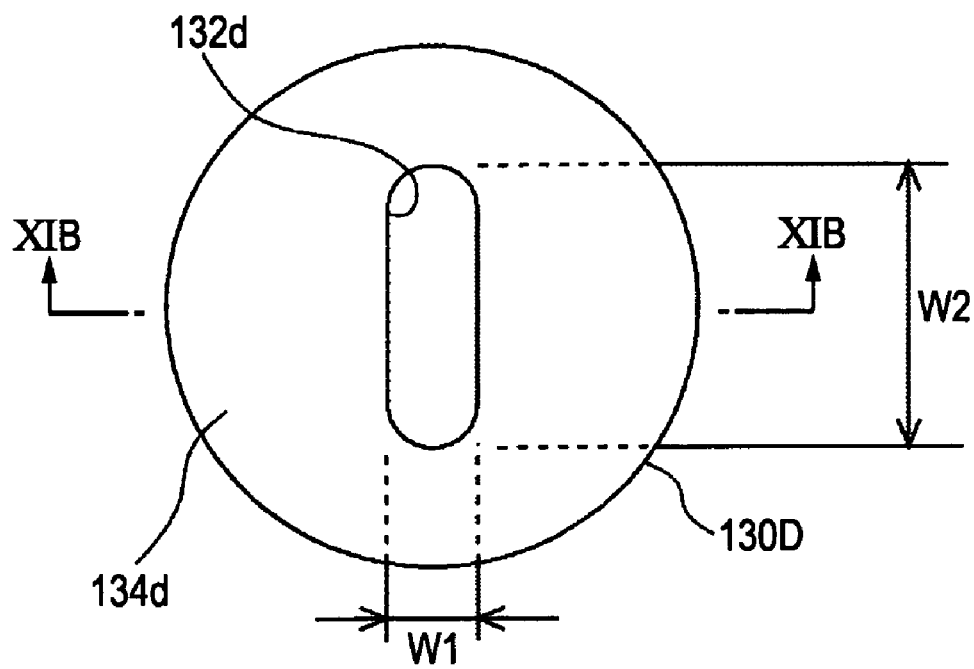
FIGS. 11A and 11B illustrate the configuration of a light adjustment member according to a fourth embodiment of the present invention.
Figure 11B:
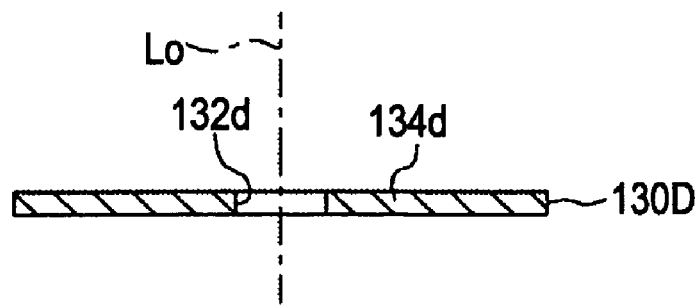

A fourth embodiment of the present invention is equipped with a modified version of the light adjustment member 130C described in the third embodiment. FIG. 11A is a plan view showing the configuration of a light adjustment member 130D according to the fourth embodiment. FIG. 11B is a cross-sectional view taken along line XIB-XIB in FIG. 11A.

Figure 12A:
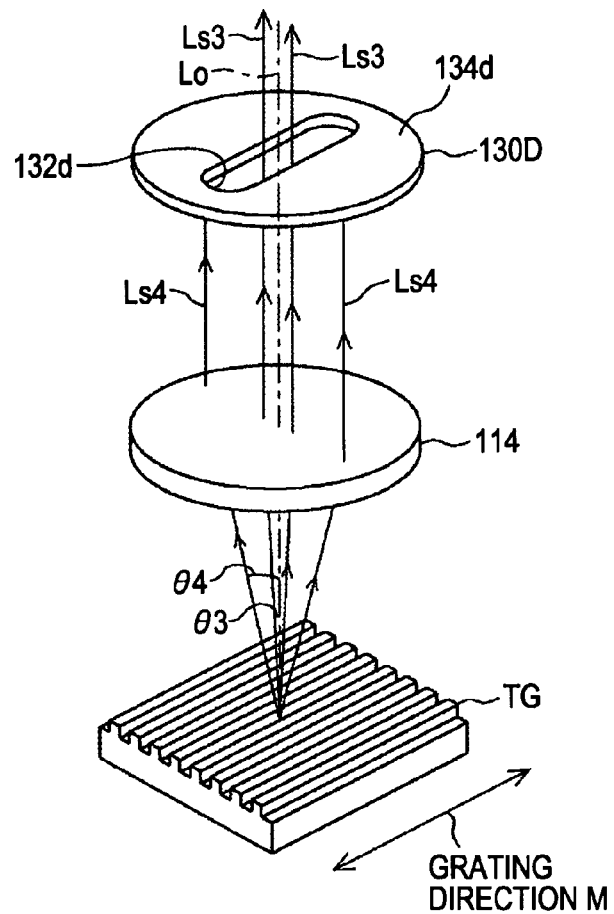
FIGS. 12A and 12B illustrate a functional example of the light adjustment member shown in FIGS. 11A and 11B.
Figure 12B:
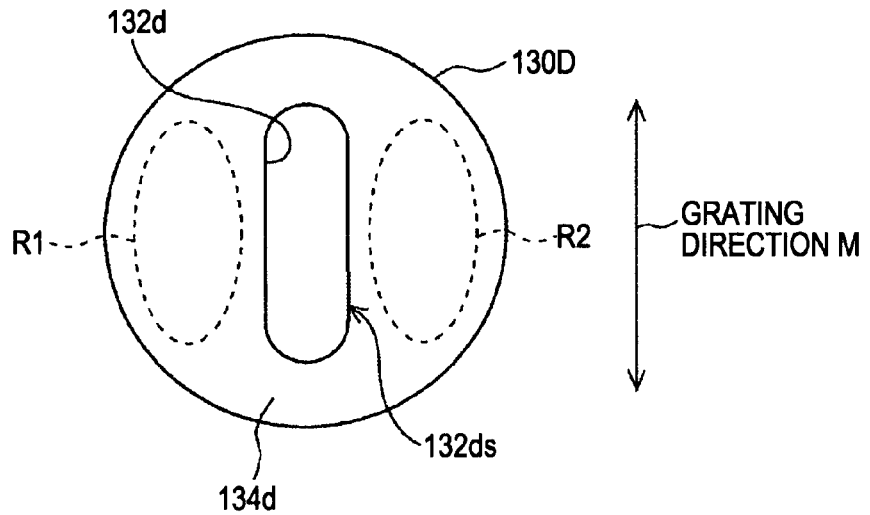

FIGS. 12A and 12B illustrate a functional example of the light adjustment member 130D.

As shown in FIGS. 11A and 11B, the light adjustment member 130D includes a main light-adjustment-member body 134d functioning as a light blocking section that blocks certain diffracted light scattering from the measurement surface TG and an aperture section 132d through which reflected light other than the diffracted light is allowed to pass. The main light-adjustment-member body 134d is formed of a flat plate having a circular shape in plan view and composed of, for example, a metallic material or a glass material. The main light-adjustment-member body 134d functions as a light blocking section that blocks diffracted light except for where the aperture section 132d is formed. For example, peripheral regions located at opposite sides of the aperture sections 132d function as light blocking regions R1 and R2 (see FIG. 12B).

The aperture section 132d has an oblong ellipsoidal shape and is formed substantially in the middle of the main light-adjustment-member body 134d. In detail, the aperture section 132d is defined by a pair of longitudinal edges 132ds that are opposed to each other and a pair of circular-arc edges that connect the longitudinal edges 132ds at the opposite ends of the aperture section 132d. The light adjustment member 130D is attached to the chassis (not shown) such that the longitudinal edges 132ds of the aperture section 132d extend parallel to a direction in which grooves that form the uneven-surface pattern of the diffraction grating extend (see FIG. 12A). This direction will be referred to as a "grating direction M" hereinafter. An aperture dimension W1 in the lateral direction and an aperture dimension W2 in the longitudinal direction of the aperture section 132d are set so that the aforementioned formula (2) is satisfied. In other words, the two aperture dimensions W1 and W2 are set so as to regulate the entry of diffracted light. The light adjustment member 130D having this configuration can be formed by patterning it into a predetermined shape by photolithography, as mentioned above.

A functional example of the light adjustment member 130D will now be described. As shown in FIGS. 12A and 12B, reflected light diffracted by the diffraction grating at an angle θ4 with respect to the optical axis $L_o$ will be referred to as "diffracted light $L_{s4}$", and reflected light other than the diffracted light will be referred to as "reflected light $L_{s3}$." The diffracted light $L_{s4}$ is diffracted by a specific angle depending on the uneven-surface pattern of the diffraction grating.

The diffracted light $L_{s4}$ diffracted by the measurement surface TG passes through the first objective lens 114 and is subsequently blocked by the light blocking regions R1 and R2 of the main light-adjustment-member body 134d. On the other hand, the reflected light $L_{s3}$ reflected by the measurement surface TG, which excludes the diffracted light $L_{s4}$, passes through the first objective lens 114 and the aperture section 132d in the light adjustment member 130D and is subsequently received by the light receiving element 120.

According to this embodiment, since the light adjustment member 130D for regulating the incident angle of the reflected light $L_r$ is disposed between the first objective lens 114 and the light receiving element 120, the entry of diffracted light $L_{s4}$ having an incident angle that can cause a measurement error in the measurement of the uneven-surface pattern of the measurement surface TG can be regulated. Consequently, an error caused by the effect of the surface roughness of the measurement surface TG is alleviated, whereby the displacement of the measurement surface TG can be detected with higher accuracy.

Fifth Embodiment

Figure 13A:
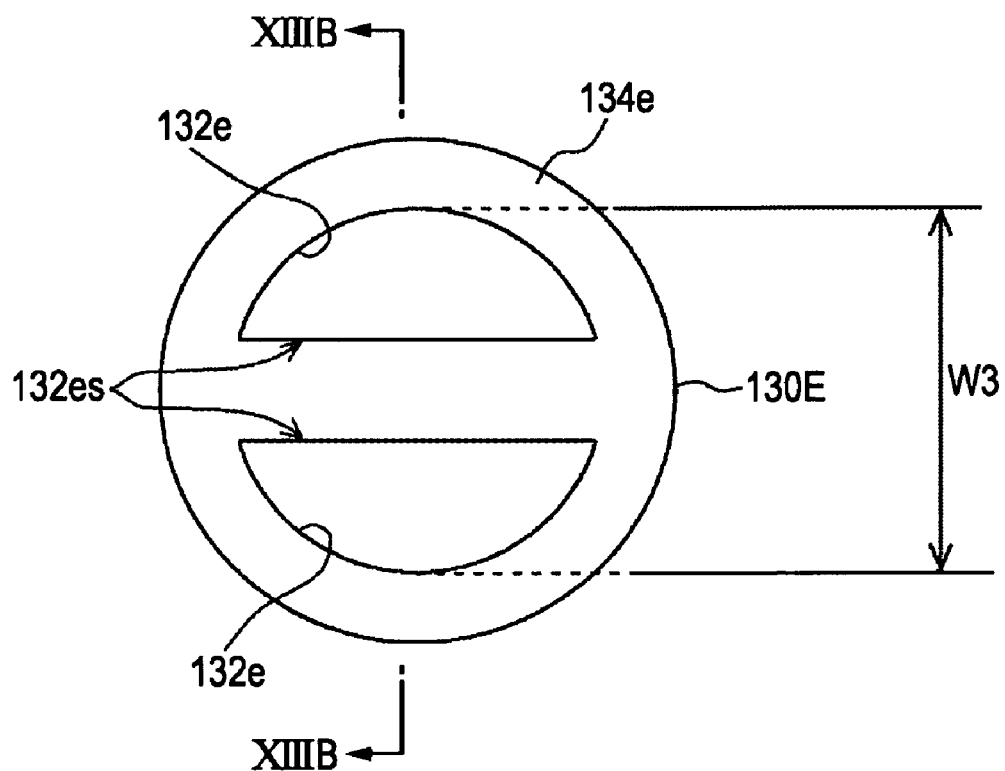
FIGS. 13A and 13B illustrate the configuration of a light adjustment member according to a fifth embodiment of the present invention.
Figure 13B:
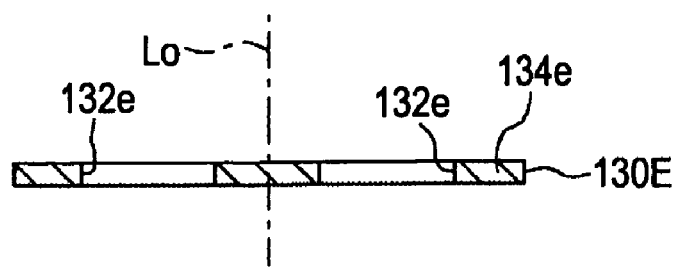
Figure 14A:
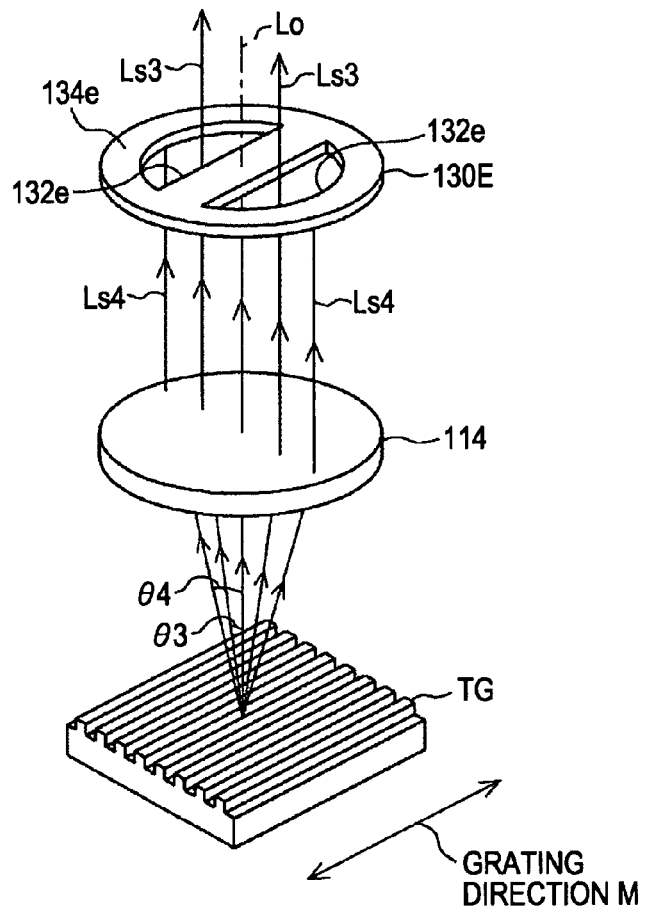
FIGS. 14A and 14B illustrate a functional example of the light adjustment member shown in FIGS. 13A and 13B.
Figure 14B:
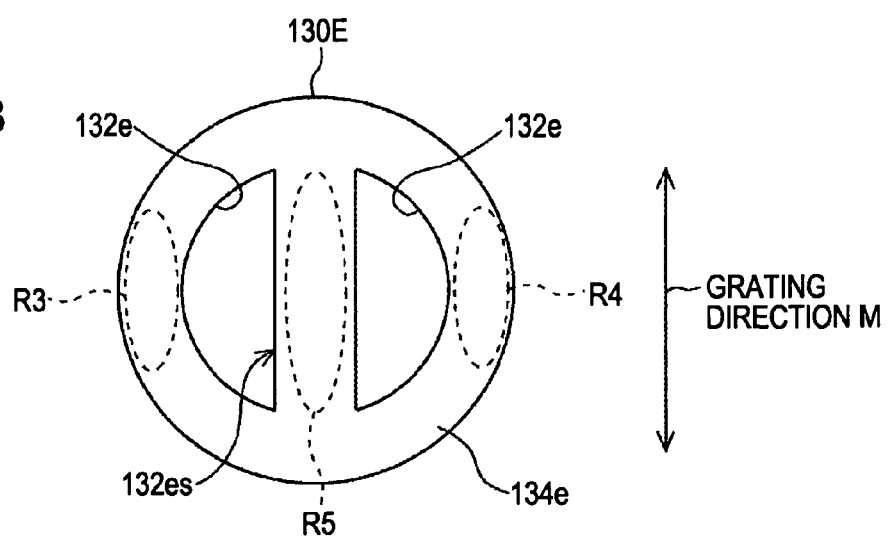

A fifth embodiment of the present invention is equipped with a modified version of the light adjustment member 130C described in the third embodiment. FIG. 13A is a plan view showing the configuration of a light adjustment member 130E according to the fifth embodiment. FIG. 13B is a cross-sectional view taken along line XIIIB-XIIIB in FIG. 13A. FIGS. 14A and 14B illustrate a functional example of the light adjustment member 130E. The description of components that are similar to those shown in FIGS. 12A and 12B will be omitted here.

As shown in FIGS. 13A and 13B, the light adjustment member 130E includes a main light-adjustment-member body 134e functioning as a light blocking section that blocks diffracted light $L_{s4}$ scattering from the measurement surface TG and an aperture section 132e through which light reflected by the measurement surface TG passes.

In this embodiment, the aperture section 132e is constituted by two semicircular apertures 132e and 132e that are spaced apart from each other by a predetermined distance such that linear edges 132es and 132es thereof are opposed to each other. The light adjustment member 130E is attached to the chassis (not shown) such that the linear edges 132es of the apertures 132e extend in the grating direction M (see FIG. 14A). An aperture diameter W3 of the aperture section 132e is set so that the aforementioned formula (2) is satisfied. In other words, the aperture diameter W3 is set so as to regulate the entry of diffracted light.

The main light-adjustment-member body 134e is formed of a flat plate having a circular shape in plan view and composed of, for example, a metallic material or a glass material. The main light-adjustment-member body 134e functions as a light blocking section that blocks the diffracted light $L_{s4}$ except for where the apertures 132e are formed. For example, peripheral regions of the apertures 132e function as light blocking regions R3 and R4 (see FIG. 14B). In addition, a central region interposed between the apertures 132e and 132e functions as a light blocking region R5 (see FIG. 14B) that blocks a paraxial ray, as in the first embodiment.

A functional example of the light adjustment member 130E will now be described. The diffracted light $L_{s4}$ passes through the first objective lens 114 and is subsequently blocked by the light blocking regions R3 and R4 of the main light-adjustment-member body 134e. On the other hand, the reflected light $L_{s3}$ reflected by the measurement surface TG, which excludes the diffracted light $L_{s4}$, passes through the first objective lens 114 and the apertures 132e and 132e in the light adjustment member 130E and is subsequently received by the light receiving element 120.

According to this embodiment, since the light adjustment member 130E for regulating the incident angle of the reflected light $L_r$ is disposed between the first objective lens 114 and the light receiving element 120, the entry of reflected light $L_r$ having an incident angle that can cause a measurement error in the measurement of the uneven-surface pattern of the measurement surface TG can be regulated. Consequently, an error caused by the effect of the surface roughness of the measurement surface TG is alleviated, whereby the displacement of the measurement surface TG can be detected with higher accuracy.

Sixth Embodiment

A sixth embodiment of the present invention will be described below with reference to the drawings. A light adjustment member 130F according to this embodiment differs from those in the first to fifth embodiments in that it has various aperture sections each having a function for reducing the resolution as well as a function for blocking scattered light. Components that are similar to those in the displacement detecting device 100A and the non-contact sensors 100A and 100B described in the first to fifth embodiments are given the same reference numerals, and the detailed description thereof will be omitted here.

Figure 15:
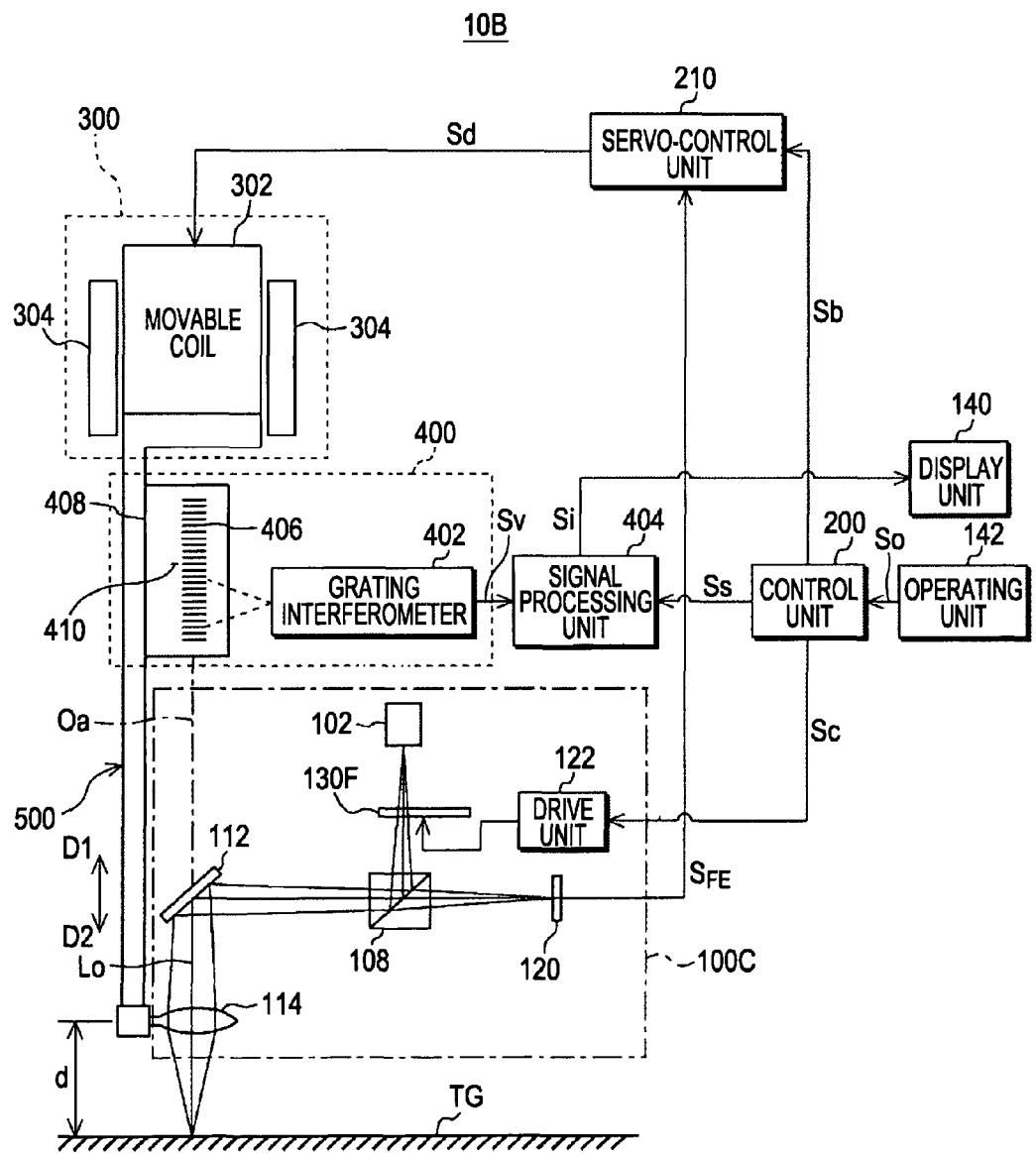
FIG. 15 illustrates the configuration of a displacement detecting device according to a sixth embodiment of the present invention.

FIG. 15 illustrates the configuration of a displacement detecting device 10B according to the sixth embodiment of the present invention. As shown in FIG. 15, the displacement detecting device 10B includes a non-contact sensor 100C, the control unit 200, the servo-control unit 210, the actuator 300, the displacement-amount measuring unit 400, the signal processing unit 404, the display unit 140, and an operating unit 142.

The operating unit 142 is defined by, for example, a keyboard or a remote controller and is used for selecting any one of the aperture sections in the light adjustment member 130F. When the user performs a predetermined operation on the operating unit 142, the operating unit 142 generates an operation signal $S_o$ that corresponds to the predetermined operation and outputs it to the control unit 200.

Based on the operation signal $S_o$ output from the operating unit 142, the control unit 200 generates a drive signal $S_c$ for rotationally driving a drive unit 122 and outputs it to the drive unit 122. For example, if the user operates the operating unit 142 to select an aperture section $130F_7$ (see FIG. 17), the control unit 200 generates a drive signal $S_c$ that causes the aperture section $130F_7$ to be positioned on the optical axis $L_o$ of the output light L.

Based on the drive signal $S_c$ received from the control unit 200, the drive unit 122 rotationally drives the light adjustment member 130F linked to the drive unit 122 by means of a shaft $O_R$ (see FIG. 16) and stops the light adjustment member 130F at a predetermined position. For example, if the received drive signal $S_c$ corresponds to the aperture section $130F_7$, the light adjustment member 130F is rotated until the aperture section $130F_7$ thereof is positioned on the optical axis $L_o$.

Figure 16:
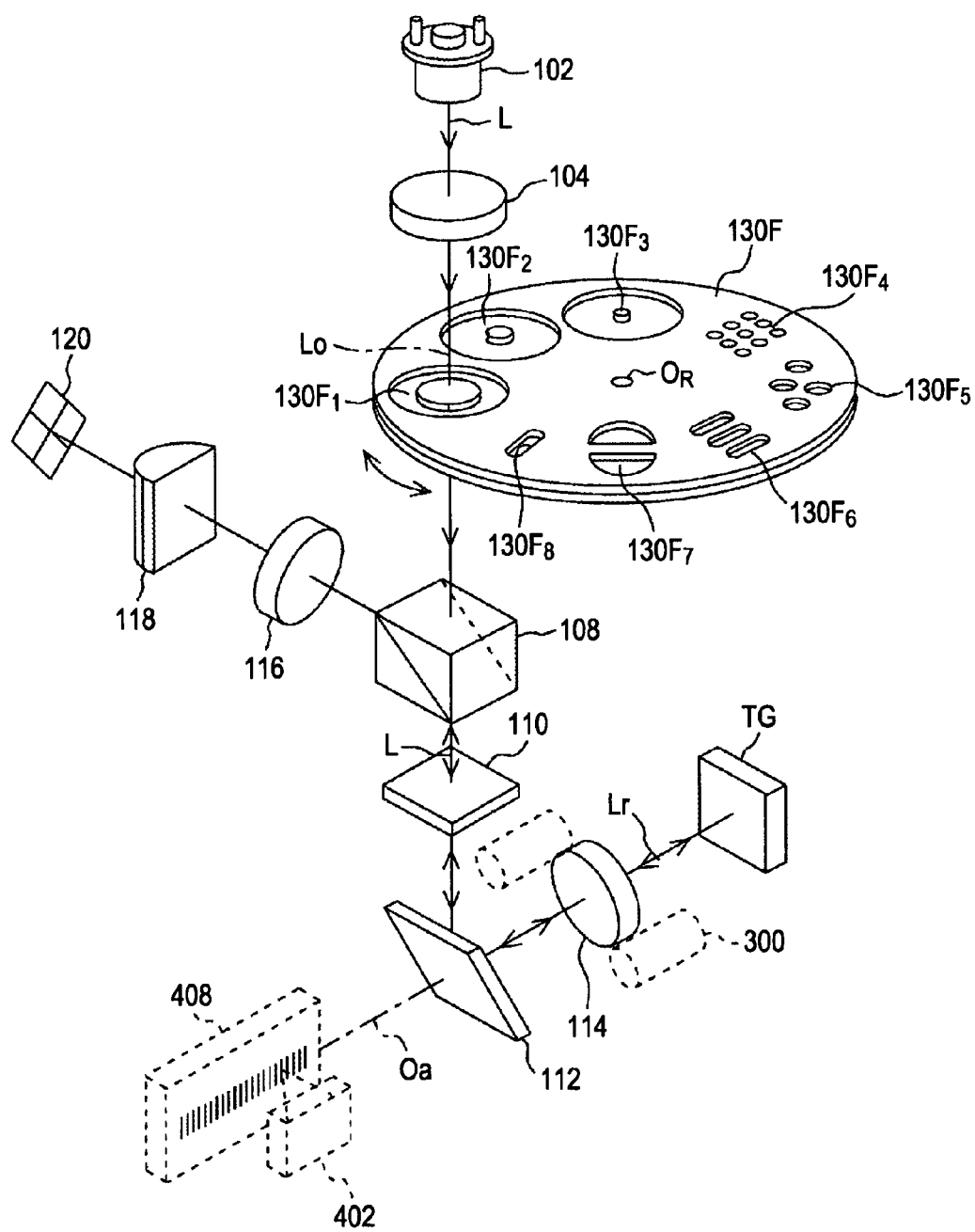
FIG. 16 illustrates the configuration of a non-contact sensor shown in FIG. 15.

The configuration of the non-contact sensor 100C will now be described. FIG. 16 illustrates the configuration of the non-contact sensor 100C. As shown in FIG. 16, the non-contact sensor 100C includes the light source 102, the collimator lens 104, the light adjustment member 130F, the polarizing beam splitter 108, the quarter-wave plate 110, the mirror 112, the first objective lens 114, the second objective lens 116, the astigmatism generating lens 118, and the light receiving element 120. The light adjustment member 130F is disposed between the collimator lens 104 and the polarizing beam splitter 108. Alternatively, the light adjustment member 130F may be disposed between the polarizing beam splitter 108 and the second objective lens 116 or between the polarizing beam splitter 108 and the quarter-wave plate 110.

Figure 17:
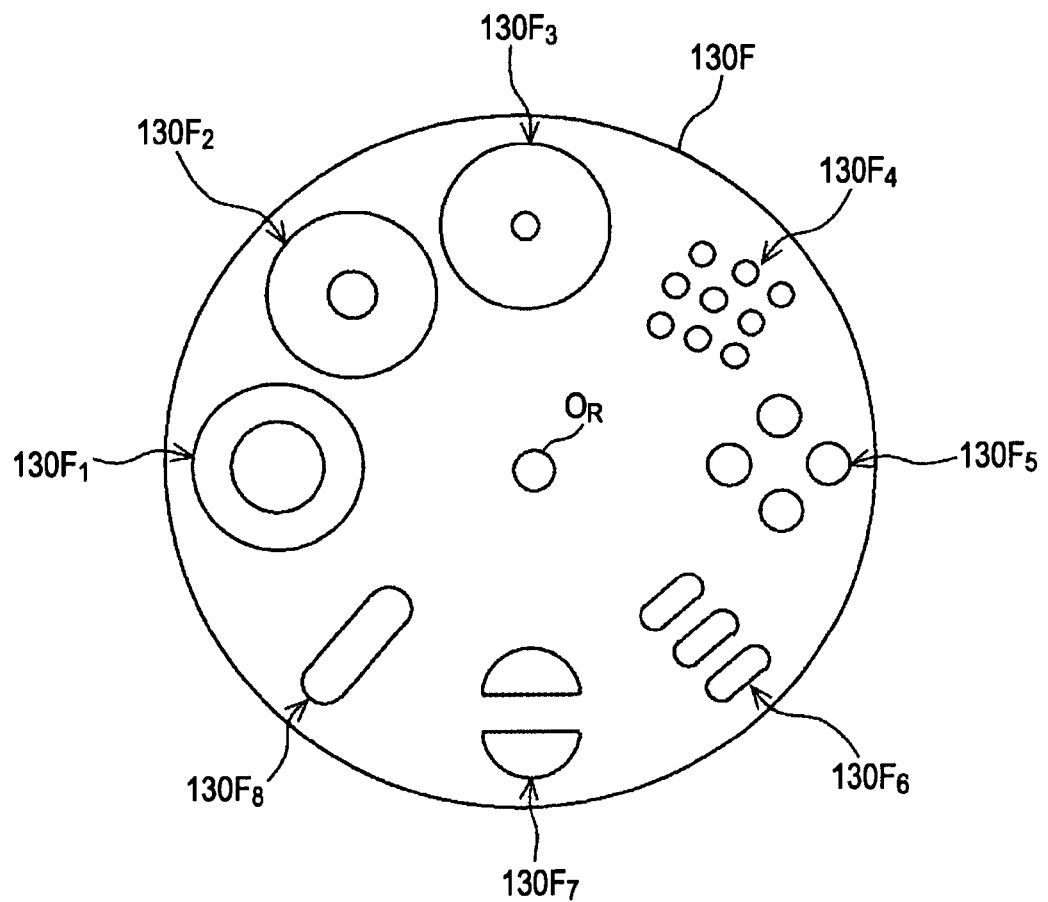
FIG. 17 illustrates the configuration of a light adjustment member shown in FIG. 15.

FIG. 17 illustrates the configuration of the light adjustment member 130F. As shown in FIG. 17, the light adjustment member 130F has a plurality of aperture sections $130F_1$, $130F_2$, $130F_3$, $130F_4$, $130F_5$, $130F_6$, $130F_7$, and $130F_8$ of various predetermined patterns. The aperture sections $130F_1$ to $130F_8$ are formed at equal intervals around the shaft $O_R$ of the light adjustment member 130F and along the outer edge of the light adjustment member 130F. When each of the aperture sections $130F_1$ to $130F_8$ is stopped at a reference position on the optical axis $L_o$, the center of the aperture section $130F_1$ to $130F_8$ is aligned with the optical axis $L_o$.

The aperture section $130F_1$ is similar to that in the light adjustment member 130A according the first embodiment in having a function for reducing the resolution of the output light L. The aperture section $130F_2$ is similar to the aperture section $130F_1$ in having a function for reducing the resolution of the output light L. An inner diameter of the aperture section $130F_2$ is smaller than an inner diameter of the aperture section $130F_1$, and an outer diameter of the aperture section $130F_2$ is equal to an outer diameter of the aperture section $130F_1$. The aperture section $130F_3$ is similar to the aperture section $130F_1$ in having a function for reducing the resolution of the output light L. An inner diameter of the aperture section $130F_3$ is smaller than the inner diameter of the aperture section $130F_2$, and an outer diameter of the aperture section $130F_3$ is equal to the outer diameter of the aperture section $130F_1$.

The aperture section $130F_4$ is constituted by nine circular apertures. The aperture section $130F_4$ is similar to those in the light adjustment members 130A and 130C according to the first and third embodiments in having a function for reducing the resolution of the output light L as well as blocking diffracted light of a certain incident angle. The aperture section $130F_5$ is constituted by four circular apertures. The aperture section $130F_5$ is similar to those in the light adjustment members 130A and 130C according to the first and third embodiments in having a function for reducing the resolution of the output light L as well as blocking diffracted light of a certain incident angle. The aperture section $130F_6$ is constituted by three ellipsoidal apertures. The aperture section $130F_6$ is similar to those in the light adjustment members 130A and 130C according to the first and third embodiments in having a function for reducing the resolution of the output light L as well as blocking diffracted light of a certain incident angle.

The aperture section $130F_7$ is similar to that in the fourth embodiment in having a function for blocking diffracted light of a certain incident angle. The aperture section $130F_8$ is similar to that in the fifth embodiment in having a function for blocking diffracted light of a certain incident angle.

As described above, according to this embodiment, one of the aperture sections $130F_1$ to $130F_8$ that is suitable for the characteristics and the shape of the measurement surface TG, for example, can be selected by operating the operating unit 142. For example, if the measurement surface TG has an uneven-surface pattern of a diffraction grating, the aperture section $130F_7$ or the aperture section $130F_8$ that can regulate the incident angle of diffracted light may be selected by operating the operating unit 142. Thus, the displacement of the measurement surface TG can be measured with optimal detection accuracy for the measurement surface TG, whereby displacement information of the measurement surface TG that is suitable for a measurement purpose can be obtained.

The technical scope of the present invention is not limited to the embodiments described above and may include various modifications of the above-described embodiments so long as they do not depart from the scope of the invention.

For example, the light adjustment members 130A, 130B, and 130E described in the first, second, and fifth embodiments may alternatively be disposed between the polarizing beam splitter 108 and the quarter-wave plate 110. With this configuration, the light adjustment member can block the paraxial ray of the output light L as well as regulate the incident angle of the reflected light $L_r$, whereby the displacement of the measurement surface TG can be measured with optimal accuracy for the surface roughness of the measurement surface TG.

As a further alternative, one of the first and second embodiments may be combined with one of the third to fifth embodiments. Specifically, the light adjustment member 130A or 130B may be disposed between the collimator lens 104 and the polarizing beam splitter 108, and the light adjustment member 130C, 130D, or 130E may be disposed between the polarizing beam splitter 108 and the astigmatism generating lens 118. In consequence, since the resolution of the output light L can be reduced and diffracted light with a specific incident angle included in the reflected light $L_r$ can be blocked, the displacement of the measurement surface TG can be detected with higher accuracy.

Since a voice coil motor is used as the actuator 300 in the first embodiment, the linearity with respect to the displacement of the measurement surface TG is high. The reason that a voice coil motor is used is that a voice coil motor moves linearly in response to electric current supplied to the movable coil 302. Therefore, the amount of displacement can be readily detected by measuring the electric current supplied to the movable coil 302. As an alternative to a voice coil motor, the actuator 300 may be defined by, for example, a direct-current servo motor, a stepping motor, or a piezoelectric device.

Although an astigmatic method is used for obtaining the focus error signal $S_{FE}$ in the first embodiment, the astigmatic method may be replaced by a critical-angle method or a knife-edge method. In either method, a control operation is performed so as to cause the value of the focus error signal $S_{FE}$ to be zero, whereby the displacement can be accurately detected even if the reflectivity of the measurement surface TG varies.

An optical detecting system constituted by the light source 102, the polarizing beam splitter 108, the mirror 112, and the light receiving element 120 may be attached to the link member 500 so as to move together with the first objective lens 114, or may be fixed to the chassis (not shown). In a case where the optical detecting system is configured to move together with the first objective lens 114, the displacement-amount detecting range can be increased to the full scale range of the linear scale 408. On the other hand, in a case where the optical detecting system is fixed to the chassis, that is, set in a distributive arrangement, the actuator 300 can be relatively reduced in size and the weight of the displacement detecting device 100A including the first objective lens 114 can be reduced. In consequence, the amount of displacement can be detected at higher speed.

The present application contains subject matter related to that disclosed in Japanese Priority Patent Application JP 2008-109467 filed in the Japan Patent Office on Apr. 18, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A displacement detecting device comprising:
a non-contact sensor having a light source, an objective lens that focuses output light emitted from the light source onto a measurement surface to be measured, and a light receiving element that detects displacement information on the basis of a focal length of the objective lens by using reflected light reflected by the measurement surface to be measured after being focused on the measurement surface by the objective lens;
a control unit that adjusts the focal length of the objective lens on the basis of the displacement information detected by the light receiving element;
a displacement-amount measuring unit having a linear scale that is attached to the objective lens with a link member therebetween and configured to measure an amount of displacement of the linear scale when the focal length of the objective lens is adjusted by the control unit; and
a light adjustment member disposed at least between the light source and the objective lens and in an optical path between the objective lens and the light receiving element, the light adjustment member having an aperture section through which the output light passes and a light blocking section that blocks a specific light component of the output light, the light adjustment member being configured to adjust a resolution of the reflected light reflected by the measurement surface or a resolution of output light, the output light being output by the light source, wherein
the light adjustment member adjusts resolution of the output light to be focused on the measurement surface and regulates an incident angle of the reflected light reflected by the measurement surface,
the light blocking section is provided on an optical axis of the output light and blocks a first output light component of the output light, the first output light component including a paraxial ray, the light blocking section regulates a first reflected light component of the reflected light, the first reflected light component having a first incident angle with respect to an optical axis, and
the aperture section allows a second output light component that surrounds the first output light component to pass therethrough toward the objective lens and allows a second reflected light component of the reflected light to pass therethrough toward the light receiving element, the second reflected light component having a second incident angle that is smaller than the first incident angle with respect to the optical axis.

2. The displacement detecting device according to claim 1, wherein the measurement surface has an uneven-surface pattern of a diffraction grating,
wherein the following relationship is satisfied $\sin\theta_1 \pm \sin\theta_2 = m\lambda/d$
where $\theta_1$ denotes an incident angle of light incident on the diffraction grating, $\theta_2$ denotes a diffraction angle of light diffracted by the diffraction grating, d denotes grating spacing of the diffraction grating, m denotes a diffraction order, and $\lambda$ denotes a wavelength, and wherein an aperture dimension of the aperture section in the light adjustment member is set so that the incident angle $\theta_1$ and the diffraction angle $\theta_2$ satisfy the condition $|\theta_1| \neq |\theta_2|$.

3. A displacement detecting device according to claim 1, wherein
the light adjustment member is configured to reduce the resolution of the reflected light reflected by the measurement surface.

4. A displacement detecting device according to claim 1, wherein
the light adjustment member is configured to reduce the resolution of the output light output by the light source.

5. A displacement detecting device comprising:
a non-contact sensor having a light source, an objective lens that focuses output light emitted from the light source onto a measurement surface to be measured, and a light receiving element that detects displacement information on the basis of a focal length of the objective lens by using reflected light reflected by the measurement surface to be measured after being focused on the measurement surface by the objective lens;
a control unit that adjusts the focal length of the objective lens on the basis of the displacement information detected by the light receiving element;
a displacement-amount measuring unit having a linear scale that is attached to the objective lens with a link member therebetween and configured to measure an amount of displacement of the linear scale when the focal length of the objective lens is adjusted by the control unit; and a light adjustment member adjusts resolution of the output light to be focused on the measurement surface and regulates an incident angle of the reflected light reflected by the measurement surface, the light adjustment member is disposed in an optical path between the objective lens and the light receiving element, and has an aperture section through which the reflected light passes and a light blocking section that blocks a specific light component of the reflected light, the light adjustment member is configured to adjust a resolution of the reflected light reflected by the measurement surface or a resolution of oujput light, the output light being output by the light source, the light blocking section is provided on an optical axis of the output light and blocks a first reflected light component of the light reflected by the measurement surface, the first reflected light component including a paraxial ray, the light blocking section regulates a first reflected light component of the reflected light, the first reflected light component having a first incident angle with respect to an optical axis, and the aperture section allows a second output light component that surrounds the first output light component to pass therethrough toward the objective lens and allows a second reflected light component of the light reflected by the measurement surface to pass therethrough toward the objective lens, the second reflected light component surrounding the first reflected light component.

\* \* \* \* \*